United States Patent
Alfraih et al.

(10) Patent No.: US 11,483,342 B2
(45) Date of Patent: Oct. 25, 2022

(54) UTILIZING WEB APPLICATION FIREWALL AND MACHINE LEARNING TO DETECT COMMAND AND CONTROL

(71) Applicant: SAUDI ARABIAN OIL COMPANY, Dhahran (SA)

(72) Inventors: Mohammed Adel Alfraih, Dhahran (SA); Khalid A. Hazmi, Dhahran (SA); Ziad I. Omair, Dhahran (SA); Sultan Saadaldean Alsharif, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 213 days.

(21) Appl. No.: 16/887,650

(22) Filed: May 29, 2020

(65) Prior Publication Data
US 2021/0377295 A1 Dec. 2, 2021

(51) Int. Cl.
*H04L 29/06* (2006.01)
*H04L 9/40* (2022.01)
*G06N 20/00* (2019.01)
*H04L 41/16* (2022.01)

(52) U.S. Cl.
CPC ........ *H04L 63/1466* (2013.01); *G06N 20/00* (2019.01); *H04L 41/16* (2013.01); *H04L 63/0236* (2013.01); *H04L 63/20* (2013.01)

(58) Field of Classification Search
CPC ...... H04L 63/1466; H04L 41/16; G06N 20/00
See application file for complete search history.

(56) References Cited

U.S. PATENT DOCUMENTS

| | | | |
|---|---|---|---|
| 7,934,253 B2* | 4/2011 | Overcash | G06F 21/55 726/25 |
| 8,429,751 B2* | 4/2013 | Mizrahi | H04L 63/168 709/227 |
| 8,549,645 B2 | 10/2013 | Tang et al. | |
| 8,595,840 B1 | 11/2013 | Malibiran et al. | |
| 8,682,812 B1* | 3/2014 | Ranjan | H04L 63/1425 706/12 |

(Continued)

FOREIGN PATENT DOCUMENTS

| | | |
|---|---|---|
| WO | 2018142404 A1 | 8/2018 |
| WO | 2019063389 A1 | 4/2019 |

OTHER PUBLICATIONS

International Search Report and Written Opinion issued in Application No. PCT/US2020/039482, dated Feb. 22, 2021 (12 pages).

(Continued)

*Primary Examiner* — Wasika Nipa
(74) *Attorney, Agent, or Firm* — Osha Bergman Watanabe & Burton LLP

(57) ABSTRACT

A method for detecting Command and Control (C&C) toward a web application in a network includes: obtaining, using a Web Application Firewall (WAF) of the network, network traffic between the web application and a server outside the network; transmitting the network traffic from the WAF to a machine learning model; determining, using the machine learning model, whether the network traffic includes a command signature; in response to determining that the network traffic includes a command signature, generating a notification; and determining, based on the notification, whether the server is a C&C.

17 Claims, 9 Drawing Sheets

(56) References Cited

U.S. PATENT DOCUMENTS

| | | |
|---|---|---|
| 8,839,430 B2 | 9/2014 | Maatta et al. |
| 9,288,220 B2 | 3/2016 | Raugas et al. |
| 9,660,960 B2 | 5/2017 | Phonsa et al. |
| 9,672,355 B2 | 6/2017 | Titonis et al. |
| 10,009,366 B2 | 6/2018 | Lefebvre et al. |
| 10,356,117 B2 | 7/2019 | Brabec et al. |
| 10,425,436 B2 | 9/2019 | Firstenberg et al. |
| 10,581,881 B2 | 3/2020 | Muddu et al. |
| 10,594,677 B2 | 3/2020 | Oberheide et al. |
| 2011/0231564 A1 | 9/2011 | Korsunsky et al. |
| 2014/0359761 A1 | 12/2014 | Altman et al. |
| 2018/0063188 A1* | 3/2018 | Karin .................. G06F 16/35 |
| 2019/0020670 A1 | 1/2019 | Brabec et al. |
| 2019/0065744 A1 | 2/2019 | Gaustad |
| 2019/0102337 A1 | 4/2019 | Brabec et al. |
| 2019/0222591 A1 | 7/2019 | Kislitsin et al. |

OTHER PUBLICATIONS

"Web Application Firewall", OWASP, Date Accessed: Mar. 10, 2020, URL: <https://owasp.org/www-community/Web_Application_Firewall> (3 pages).

Koehrsen, Will, "An Implementation and Explanation of the Random Forest in Python: A guide for using and understanding the random forest by building up from a single decision tree", Towards Data Science, Aug. 30, 2018, Date Accessed: Mar. 10, 2020, URL: <https://towardsdatascience.com/an-implementation-and-explanation-of-the-random-forest-in-python-77bf308a9b76> (20 pages).

"Supervised Learning", Supervised Learning—An Overview, ScienceDirect, Elsevier B.V., Date Accessed: Mar. 10, 2020, URL: <www.sciencedirect.com/topics/computer-science/supervised-learning> (16 pages).

"Command and Control", Wikipedia, Date Accessed: Feb. 2, 2020, URL: <https://en.wikipedia.org/wiki/Command_and_control> (8 pages).

* cited by examiner

| Network traffic sample | Port scanning activity | Data exfiltration commands | Memory manipulation commands | Crypto vulnerability exploit commands | Mining commands | Command shell commands | Reverse HTTP shell | Command shell capture | Session Manipulation | Command Signature Detected |
|---|---|---|---|---|---|---|---|---|---|---|
| 1 | Legit | Yes | Yes | No | Yes | Yes | Yes | Yes | Yes | Yes |
| 2 | suspicious | No | No | No | No | No | No | No | No | Yes |
| 3 | Legit | No | No | Yes | No | No | No | No | No | Yes |
| 4 | Legit | Yes | Yes | No | No | Yes | Yes | Yes | No | Yes |
| 5 | Legit | No | Yes | Yes | Yes | Yes | Yes | Yes | Yes | Yes |
| 6 | Legit | No | No | No | No | No | No | No | No | No |

FIG. 3A

| Network traffic sample | Port scanning activity | Data exfiltration commands | Memory manipulation commands | Crypto vulnerability exploit commands | Mining commands | Command shell commands | Reverse HTTP shell | Command shell capture | Session Manipulation | Command Signature Detected |
|---|---|---|---|---|---|---|---|---|---|---|
| 1 | Legit | Yes | Yes | No | Yes | Yes | Yes | Yes | Yes | Yes |
| 2 | suspicious | No | No | No | No | No | No | No | No | Yes |
| 4 | Legit | Yes | Yes | No | No | Yes | Yes | Yes | No | Yes |
| 5 | Legit | No | Yes | Yes | Yes | Yes | Yes | Yes | Yes | Yes |
| 5 | Legit | No | Yes | Yes | Yes | Yes | Yes | Yes | Yes | Yes |

FIG. 3B

| Network traffic sample | Port scanning activity | Source IP | Restricted subnet | Command shell | Command Signature Detected |
|---|---|---|---|---|---|
| 7 | Legit | Legit | Yes | Yes | No |
| 8 | Suspicious | Suspicious | Yes | No | Yes |

FIG. 4A

UTILIZING WEB APPLICATION FIREWALL AND MACHINE LEARNING TO DETECT COMMAND AND CONTROL

BACKGROUND

Over the past decades, there has been growing awareness of the importance of cybersecurity among organizations worldwide. To defend a network against cyberattacks, monitoring tools such as Web Application Firewalls (WAFs) are often implemented to detect malicious network behavior such as scans, exploits, or spam emails generated by potential malware.

Cyberattacks may be carried out in the form of command and control (C&C). Specifically, C&C may refer to an external server where an adversary (i.e., cyber attacker) has the power to control computing devices or applications within a victim network (i.e., the network being attacked) from one or more consoles using a domain name to exfiltrate data. For example, Domain Generation Algorithms (DGAs) may be used by an adversary to communicate with a C&C server so that the adversary can perform certain actions to gain access to and control the victim network from the C&C. These actions are generally referred to as command signatures. By using command signatures, an adversary may run commands or shell scripts to scan the network, discover ports, or exfiltrate data. Examples of command signatures include: reverse HTTP shell, command shell capture to detect questioned commands such as dir and nmap, session manipulation, crypto mining, scans, exploits, spam emails, and memory manipulation.

SUMMARY

In one aspect, the disclosure relates to a method for detecting C&C toward a web application in a network. The method includes: obtaining, using a WAF of the network, network traffic between the web application and a server outside the network; transmitting the network traffic from the WAF to a machine learning model; determining, using the machine learning model, whether the network traffic includes a command signature; in response to determining that the network traffic includes a command signature, generating a notification; and determining, based on the notification, whether the server is a C&C.

In another aspect, the disclosure relates to a network apparatus for detecting C&C toward a web application in a network. The network apparatus includes: a WAF that obtains network traffic between the web application and a server outside the network; a machine learning model that receives the network traffic from the WAF and determines whether the network traffic includes a command signature. In response to determining that the network traffic includes a command signature, the machine learning model generates a notification.

In another aspect, the disclosure relates to a network system that operates in a network. The network system includes a web application, a WAF, and a machine learning model. The WAF obtains network traffic between the web application and a server outside the network. The machine learning model receives the network traffic from the WAF. The machine learning model determines whether the network traffic includes a command signature. In response to determining that the network traffic includes a command signature, the machine learning model generates a notification Other aspects and advantages of the invention will be apparent from the following description and the appended claims.

BRIEF DESCRIPTION OF DRAWINGS

FIG. 3A provides an example of an original dataset that may be used to train the machine learning model according to one or more embodiments.

FIG. 3B provides an example of a bootstrapped dataset that is generated based on the original dataset of FIG. 3A and may be used to train the machine learning model according to one or more embodiments.

DETAILED DESCRIPTION

Figure 1:
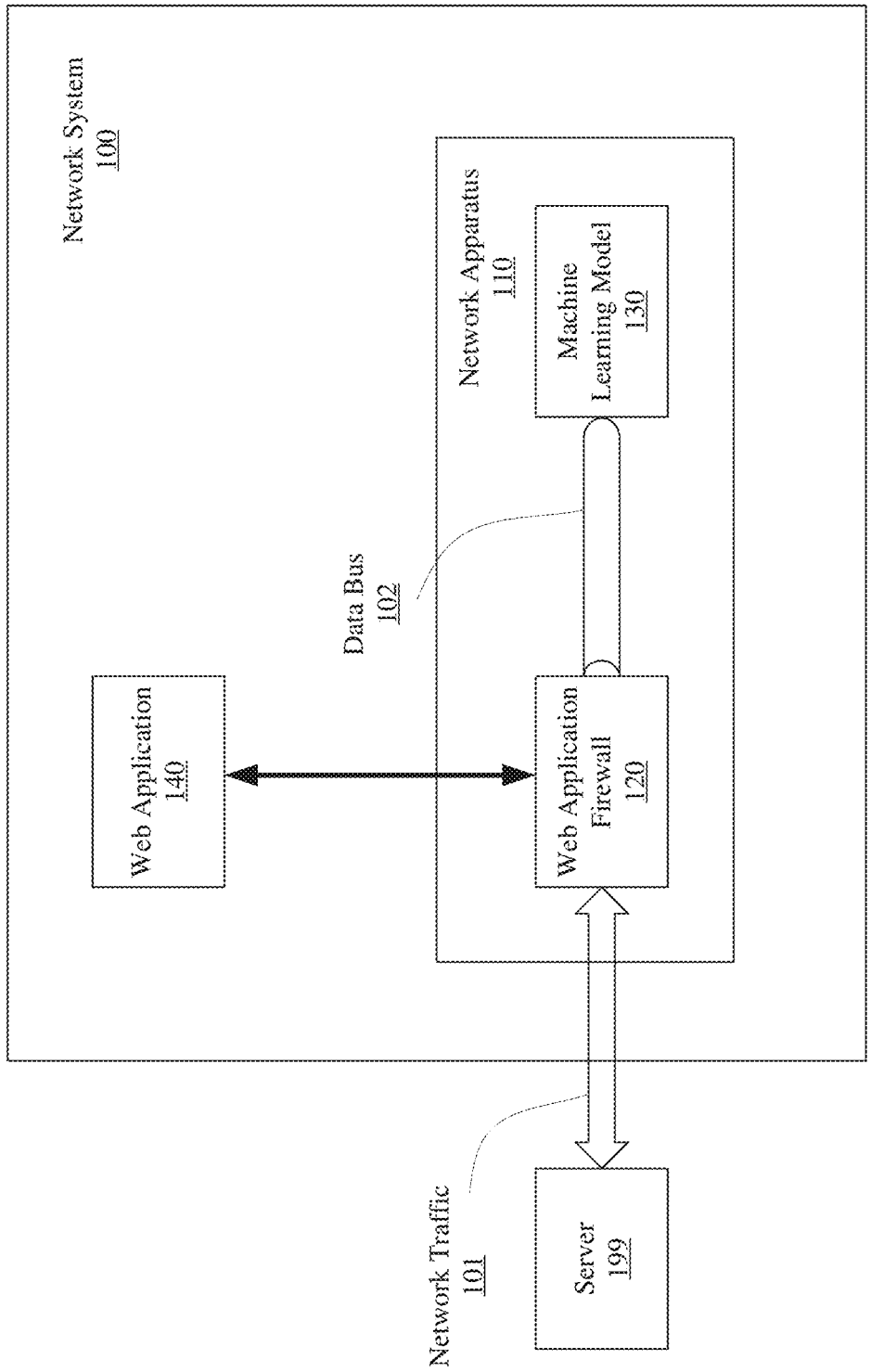
FIG. 1 is a block diagram of a network system according to one or more embodiments.

In light of the potential harm to a network caused by C&C, it is important to monitor and inspect the network traffic between the network and an external server, and take precautions whenever a suspicious command signature is detected in the network traffic. In one or more embodiments of the present disclosure, a WAF may be combined with a machine learning model to detect command signatures and raise an alert for any potential C&C threat. Embodiments of the present disclosure may thus increase the thoroughness and accuracy of network traffic inspection while requiring very limited human intervention. As such, network security may be improved.

Specific embodiments of the invention will now be described in detail with reference to the accompanying figures Like elements in the various figures are denoted by like reference numerals for consistency. Like elements may not be labeled in all figures for the sake of simplicity.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers does not imply or create a particular ordering of the elements or limit any element to being only a single element unless expressly disclosed, such as by the use of the terms "before," "after," "single," and other such terminology.

Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-7B, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a processor" includes reference to one or more of such processors.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that, one or more of the steps shown in the flowcharts may be omitted, repeated, and/or performed in a different order than the order shown. Accordingly, the scope of the invention should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

FIG. 1 is a block diagram of a network system according to one or more embodiments. In FIG. 1, the network system 100 includes a network apparatus 110 and a web application 140 that operate in a network. The network may be a public network such as Internet, or may be a private network such as a local area network (LAN) built within an organization. Components in the network system 100 may communicate via cable or via wireless signals. In addition to the network apparatus 110 and the web application 140, the network system 100 may include components that are found in a general computer network. A computer network is later described with reference to FIG. 7B.

In FIG. 1, the web application 140 may include software code that controls the operation of other software or hardware. For example, the web application 140 may control a computer to access and process data, operate a machine to perform manufacturing, or forward network commands to another network system. The web application 140 may be accessible from inside or outside the network system 100. In reality, the web application 140 may sometimes be a potential target of cyberattacks.

The network apparatus 110 may be disposed on a communication path between an entry of the network system 100 and the web application 140. As such, network traffic 101 that enters the network system 100 from a server 199 outside the network may be intercepted and inspected by the network apparatus 110 before reaching the web application 140. Likewise, output of the web application 140 may be intercepted and inspected by the network apparatus 110 before being transmitted on the network traffic 101 toward the server 199.

The network apparatus 110 includes a WAF 120 and a machine learning model 130. The WAF 120 and the machine learning model 130 may be communicatively connected via a data bus. The WAF 120 and the machine learning model 130 may include software code and/or hardware components. The WAF 120 and the machine learning model 130 may be physically implemented on separate electronic devices, or alternatively on a single electronic device. Examples of the electronic device may include a computer, a mobile terminal, a portable plug-in device, and a cloud server. In addition to the WAF 120 and the machine learning model 130, the network apparatus 110 may include components that are found in a general computing system. Such a general computing system is later described with reference to FIG. 7A.

In FIG. 1, the WAF 120 obtains the network traffic 101 between the server 199 and the web application 140. The network traffic 101 may be obtained in the form of bit streams. Before transmitting the obtained network traffic 101 to the machine learning model 130, the WAF 120 may decrypt and/or reformat the network traffic 101. For example, the WAF 120 may parse the network traffic 101 to obtain information such as the Internet Protocol (IP) address of the server 199, the IP address of the destination in the network system 100, identification of the web application 140, and the specific operation to be performed with the web application 140. Based on the obtained information, the WAF 120 may reformat the network traffic 101 in the form of individual data items which may each correspond to a separate access request to the web application 140. In addition, the WAF 120 may have features that are commonly found in general network firewalls. These common features are omitted from this disclosure for simplicity.

The machine learning model 130 may include software code that implements a supervised machine learning algorithm to determine whether the network traffic 101 includes a command signature. For example, the machine learning model 130 may include a RF classifier which may include a plurality of DTs. The DTs and the RF classifier are described in detail with reference to FIGS. 2A-2B.

Although only one server 199 and only one web application 140 are shown in FIG. 1, one of ordinary skill in the art would understand that the network apparatus 110 may simultaneously communicate with multiple servers 199 and multiple web applications 140. Similarly, although only one WAF 120 and one machine learning model 130 are shown in FIG. 1, one of ordinary skill in the art would understand that the WAF 120 and the machine learning model 130 may each be implemented as multiple instances or as a multi-stage structure.

Figure 2A:
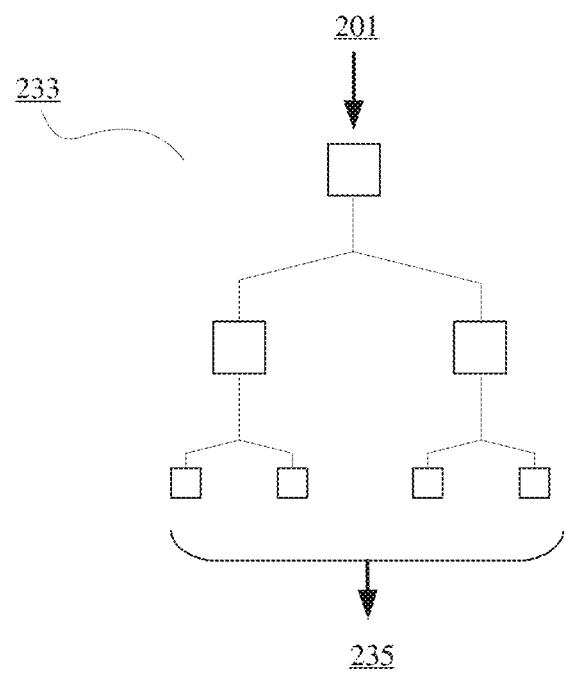
FIG. 2A illustrates a decision tree (DT) that may be used in a random forest (RF) according to one or more embodiments.

FIG. 2A illustrates a DT that may be used in a RF according to one or more embodiments. In general, a DT may refer a structure that receives an input, tests an attribute of the input at each node of the DT, branches from each node based on the test outcome, and makes a decision with regard to the classification of the input after testing for some or all of the attributes. As shown in FIG. 2A, the DT 233 receives network traffic 201 as an input from the WAF. As described above, the received network traffic 201 may be in the form of individual data items each corresponding to a separate request to access the web application.

At each node (represented as a box in FIG. 2A) of the DT 233, a test is made to determine whether the input network traffic 201 has an attribute. In particular, each attribute may correspond to a type of command signature which has been described earlier in this disclosure. Based on the test outcome (e.g., YES or NO), each node divides in two branches until the input network traffic 201 has been tested for all attributes on a decision path. After the input network traffic 201 has been tested for all attributes on the decision path, the DT 233 outputs a vote 235 as to which class the network traffic 201 falls in. This vote 235 may represent a decision made by the DT 233 as to whether the network traffic 201 includes a command signature, and if so, the type of the command signature.

Figure 2B:
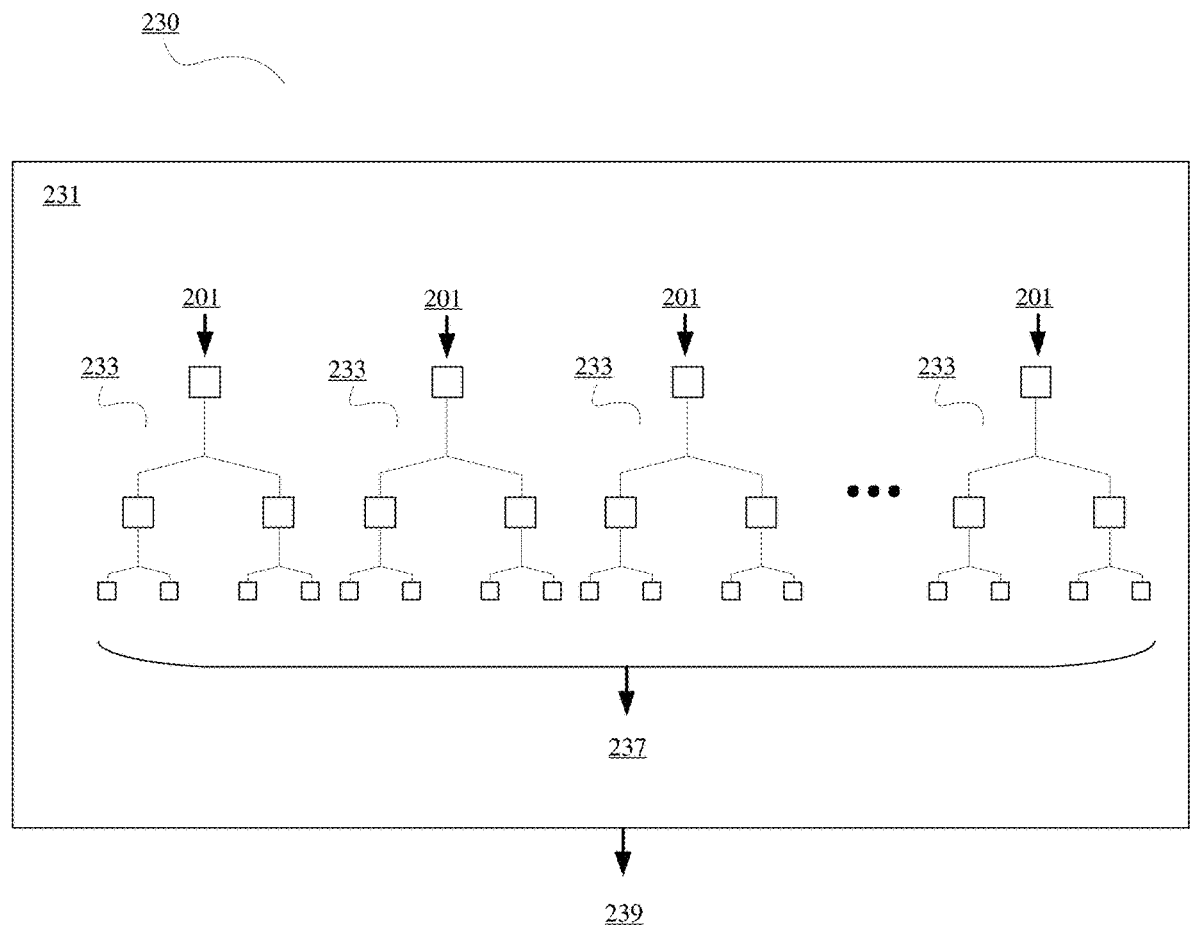
FIG. 2B illustrates a RF that may be used in a machine learning model according to one or more embodiments.

FIG. 2B illustrates a RF that is used in a machine learning model according to one or more embodiments. In FIG. 2B, the machine learning model 230 includes a RF 231. The RF 231 includes a plurality of DTs 233 that may be the same as the DT 233 illustrated in FIG. 2A.

In FIG. 2B, the network traffic 201 is input to each of the DTs 233. Based on the votes of the DTs 233, the RF 231 outputs a decision 237 on whether the network traffic 201 includes a command signature, and if so, the type of the command signature. In response to determining that the network traffic 201 includes a command signature, the machine learning model 230 generates a notification 239 such as an alert, a flag, a report, an email, or a warning. The notification 239 may then be analyzed by security personnel or an automated mechanism such as artificial intelligence to determine whether the network traffic 201 poses any C&C threat.

In some embodiments, in response to determining that the network traffic 201 includes a command signature, the machine learning model 230 may assign an identifier to the notification. The identifier may identify one or more of the type of the command signature, the external server that sends or receives the network traffic 201, and the web application targeted by the network traffic 201.

The machine learning model may be built and trained based on sample inputs and outputs. This type of machine learning is often referred to as supervised machine learning. According to one or more embodiments of the present disclosure, to build and train the machine learning model, the WAF provides the machine learning model with an original dataset that has a plurality of network traffic samples, where the classification of each network traffic sample (i.e., whether the network traffic sample has a command signature) is predetermined. Based on the original dataset, the machine learning model creates one or more bootstrapped datasets.

To further explain, FIGS. 3A and 3B provide an example of an original dataset and a bootstrapped dataset, respectively. As can be seen in FIG. 3A, the original dataset has six network traffic samples, numbered 1 to 6. Each network traffic sample is characterized using a plurality of attributes and the values of these attributes are shown in a corresponding column. In the datasets shown in FIGS. 3A and 3B, these attributes are: whether the port scanning activity included in the network traffic sample is legitimate or suspicious, and whether the network traffic sample includes any of: data exfiltration commands; memory manipulation commands; crypto vulnerability exploit commands; mining commands; command shell commands; reverse HTTP shell; command shell capture; and session manipulation. For example, the row corresponding to network traffic sample #1 shows that the port scanning activity of the sample is legitimate, and that the sample has data exfiltration commands, memory manipulation commands, mining commands, command shell commands, reverse HTTP shell, command shell capture, and session manipulation, but does not have crypto vulnerability exploit commands. According to the same row, the classification of network traffic sample #1 is predetermined as containing a command signature.

Based on the original dataset in FIG. 3A, the bootstrapped dataset in FIG. 3B is created. Using a bootstrapping algorithm, the network traffic samples in the bootstrapped dataset may be randomly selected from the original dataset, and one or more selected network traffic samples may be repeated in the bootstrapped dataset. In the bootstrapped dataset in FIG. 3B, network traffic samples #1, #2, and #4 are selected once from the original dataset, and network traffic sample #5 is selected twice from the original dataset. Because each network traffic sample remains unchanged after being selected to form the bootstrapped dataset, the attribute values and the classification of each network traffic sample remain unchanged.

It should be noted that the original dataset may include both malicious network traffic samples, i.e., those containing command signatures, and normal network traffic samples, i.e., those containing no command signature. As such, the machine learning model is trained to distinguish malicious network traffic from normal network traffic samples. In the example given in FIG. 3A, network traffic sample #6 is a normal network traffic sample.

While the original dataset in FIG. 3A has only six network traffic samples, the size of the original dataset is not limited to six. Similarly, while the bootstrapped dataset in FIG. 3B has only five network traffic samples, the size of the bootstrapped dataset is not limited to five. Further, the size of the bootstrapped dataset may be greater than, equal to, or smaller than the size of the original dataset.

The machine learning model learns from the network traffic samples in the bootstrapped dataset based on their attributes and predetermined classifications, and generates a DT. This process is explained with the reference to FIGS. 4A-4C.

FIG. 4A shows an example of a bootstrapped dataset with two network traffic samples, numbered 7 and 8. For simplicity, the corresponding original dataset is not shown. In the bootstrapped dataset of FIG. 4A, each network traffic sample has four attributes: whether the port scanning activity included in the network traffic sample is legitimate or suspicious; whether the IP address of the source of the network traffic sample is legitimate or suspicious; whether the network traffic sample intends to access a restricted sub-network; and whether the network traffic sample includes a command shell. The values of each attribute of network traffic samples 7 and 8 are shown in a corresponding column. As can be seen in FIG. 4A, network traffic sample 7 is a malicious network traffic sample while network traffic sample 8 is a normal network traffic sample.

Figure 4B:
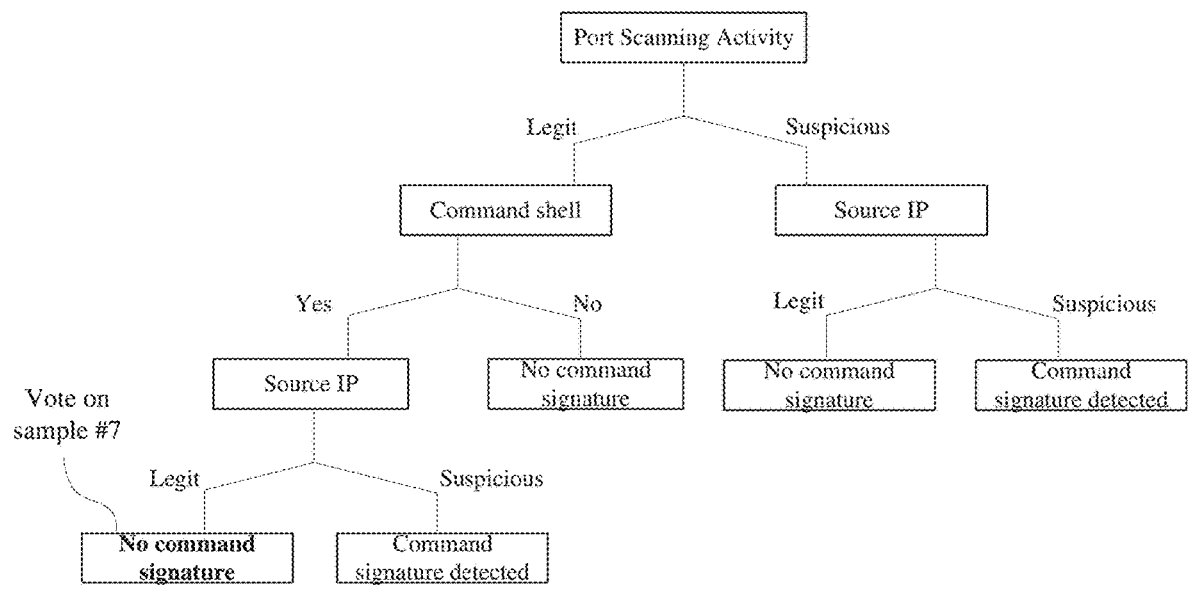
FIG. 4A shows another example of a bootstrapped dataset, and FIGS. 4B-4C each show a DT that corresponds to the bootstrapped dataset of FIG. 4A.
Figure 4C:
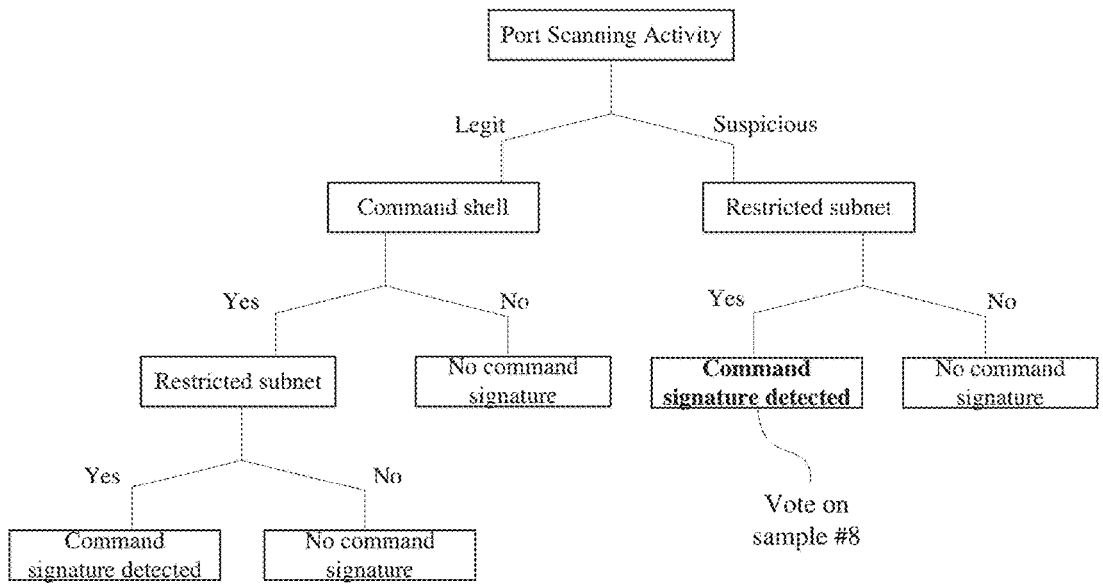

A number of algorithms are known in the art to generate a DT based on a given bootstrapped dataset. FIGS. 4B and 4C show two different DTs that both correspond to the bootstrapped dataset in FIG. 4A. The two DTs both start from the same "root node" (the node on the very top) that determines whether the port scanning activity is legitimate or suspicious, but have different decision paths growing from their respective root nodes. As can been seen in the figures, three out of the four attributes are tested in the DT of FIG. 4B: legitimacy of port scanning activity; command shell; and legitimacy of source IP. Similarly, three out of the four attributes are tested in the DT of FIG. 4C: legitimacy of port scanning activity; command shell; and access to restricted sub-network.

When fed with network traffic with unknown classification, these DTs are capable of casting votes based on the attributes of the input network traffic to determine whether the input network traffic has a command signature. In real network environment when the network traffic is much more complex, it may be desired to generate more DTs to improve voting accuracy. Also, the algorithms may be configured to allow the DTs to grow deeper such that more attributes are tested. A deeper DT generally leads to improved voting accuracy but at the cost of increased consumption of computation resources.

For a given original dataset, the bootstrapping algorithm may be randomly performed multiple times to create a plurality of bootstrapped datasets, and in turn generate a plurality of DTs to form a RF. In general, increasing the total number of bootstrapped datasets may increase the accuracy of command signature detection.

Figure 5:
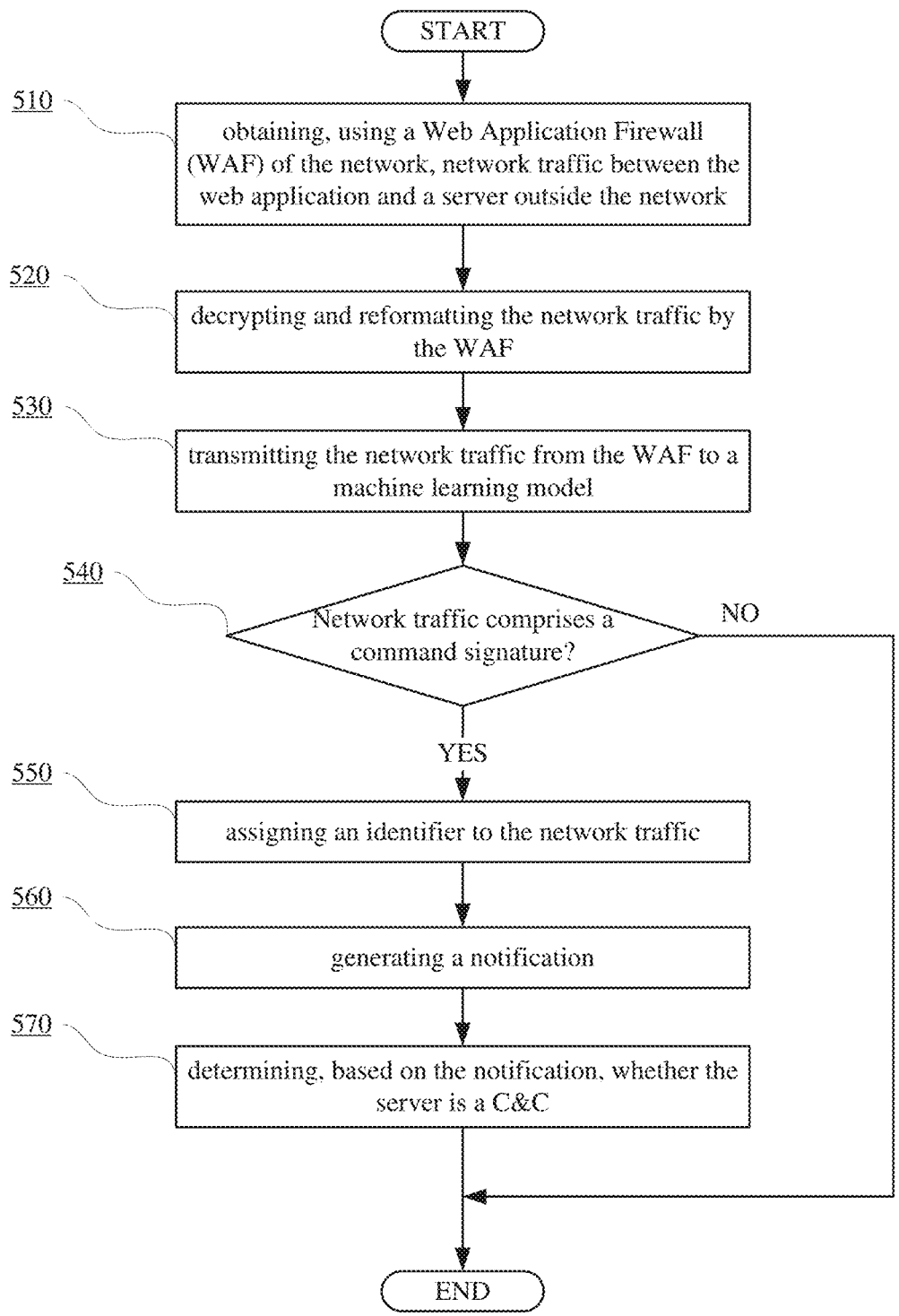
FIG. 5 is a flowchart that illustrates a method for detecting C&C according to one or more embodiments.

FIG. 5 is a flowchart that illustrates a method for detecting C&C according to one or more embodiments.

At step 510, a WAF obtains network traffic between the web application and a server outside the network.

At step 520, the WAF decrypts and reformats the network traffic.

At step 530, the network traffic is transmitted from the WAF to a machine learning model.

At step 540, the machine learning model determines whether the network traffic includes a command signature.

At step 550, in response to determining that the network traffic includes a command signature, the machine learning model assigns an identifier to the network traffic.

At step 560, the machine learning model generates a notification.

At step 570, it is determined whether the server is a C&C based on the notification.

It should be noted that the above steps may or may not be executed in the same order as they are described. For example, it is possible in some embodiments that step 550 is executed after step 560. Further, it should be noted that the not all of the above steps are required in all of the embodiments. For example, it is possible that some embodiments do not have step 520 or step 550.

Figure 6:
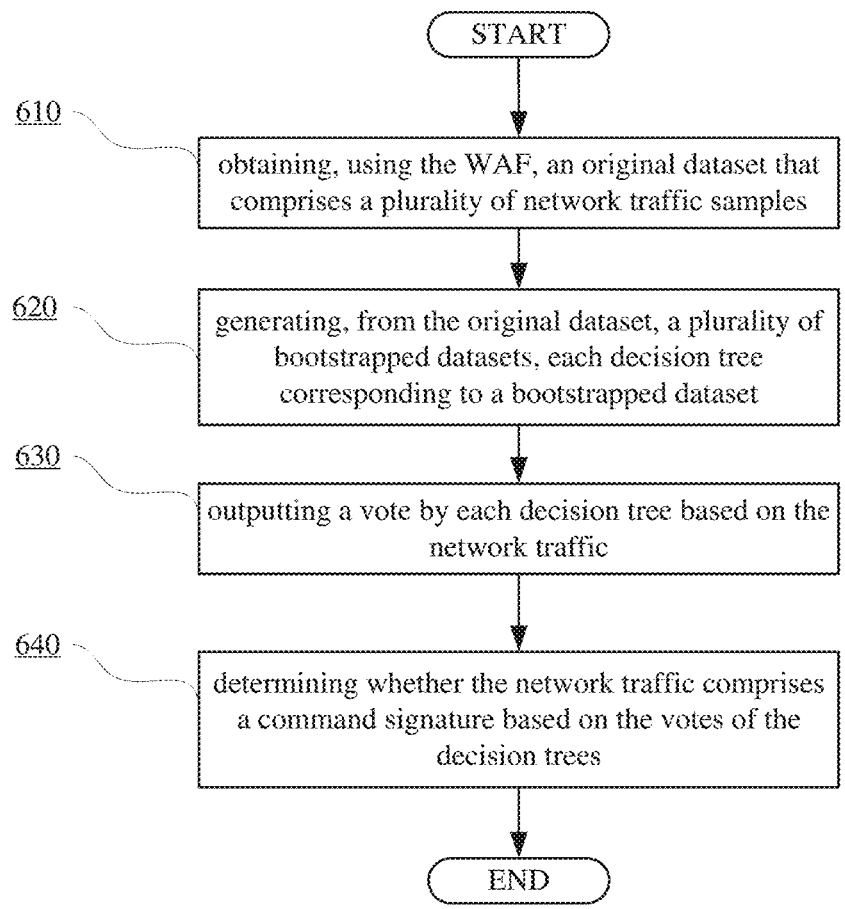
FIG. 6 is a flowchart that illustrates steps for determining whether network traffic includes a command signature according to one or more embodiments.

FIG. 6 is a flowchart that illustrates steps for using a WAF and a machine learning model to determine whether network traffic includes a command signature according to one or more embodiments. The steps in FIG. 6 may be used to perform step 540 in FIG. 5. Further, the steps in FIG. 6 may correspond to the training and decision making operations of the machine learning model 230 described with reference to FIGS. 2A and 2B.

At step 610, the WAF obtains an original dataset that includes a plurality of network traffic samples.

At step 620, the machine learning model generates a plurality of bootstrapped datasets from the original dataset, each bootstrapped dataset corresponding to one DT of a RF of the machine learning model.

At step 630, each DT outputs a vote based on the network traffic.

At step 640, the machine learning model determines, based on the votes of the DTs, whether the network traffic includes a command signature.

Figure 7A:
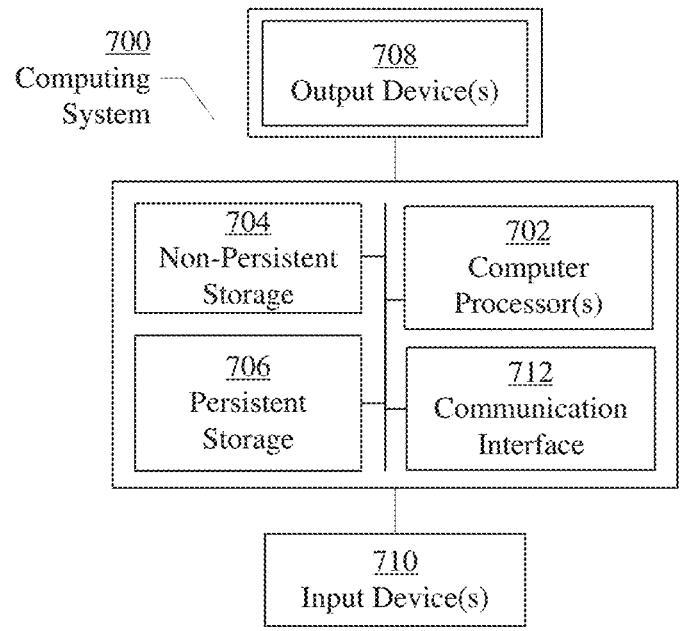
FIG. 7A shows a computing system on which components of one or more embodiments may be implemented.

Some components of one or more embodiments may be implemented on a computing system. Any combination of mobile, desktop, server, router, switch, embedded device, or other types of hardware may be used. For example, as shown in FIG. 7A, the computing system 700 may include one or more computer processors 702, non-persistent storage 704 (e.g., volatile memory, such as random access memory (RAM), cache memory), persistent storage 706 (e.g., a hard disk, an optical drive such as a compact disk (CD) drive or digital versatile disk (DVD) drive, a flash memory, etc.), a communication interface 712 (e.g., Bluetooth interface, infrared interface, network interface, optical interface, etc.), and numerous other elements and functionalities.

The computer processor(s) 702 may be an integrated circuit for processing instructions. For example, the computer processor(s) may be one or more cores or micro-cores of a processor. The computing system 700 may also include one or more input devices 710, such as a touchscreen, keyboard, mouse, microphone, touchpad, electronic pen, or any other type of input device.

The communication interface 712 may include an integrated circuit for connecting the computing system 700 to a network (not shown) (e.g., a LAN, a wide area network (WAN) such as the Internet, mobile network, or any other type of network) and/or to another device, such as another computing device.

Further, the computing system 700 may include one or more output devices 708, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) 702, non-persistent storage 704, and persistent storage 706. Many different types of computing systems exist, and the aforementioned input and output device(s) may take other forms.

Figure 7B:
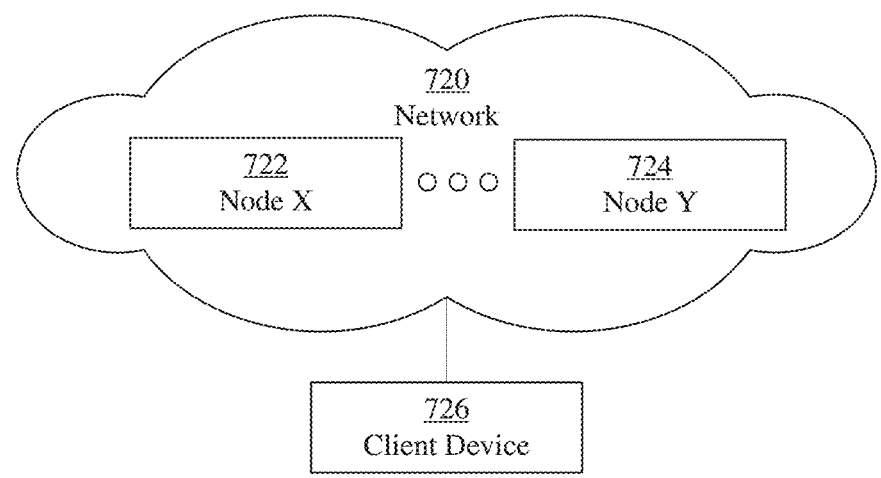
FIG. 7B shows a network in which one or more embodiments may operate.

The computing system 700 in FIG. 7A may be connected to or be a part of a network. For example, as shown in FIG. 7B, the network 720 may include multiple nodes (e.g., node X 722, node Y 724). Each node may correspond to a computing system, such as the computing system shown in FIG. 7A, or a group of nodes combined may correspond to the computing system shown in FIG. 7A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system 700 may be located at a remote location and connected to the other elements over a network.

The nodes (e.g., node X 722, node Y 724) in the network 720 may be configured to provide services for a client device 726. For example, the nodes may be part of a cloud computing system. The nodes may include functionality to receive requests from the client device 726 and transmit responses to the client device 726. The client device 726 may be a computing system, such as the computing system shown in FIG. 7A. Further, the client device 726 may include and/or perform all or a portion of one or more embodiments of the disclosure.

The computing system or group of computing systems described in FIGS. 7A and 7B may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

Once data is obtained, such as by using techniques described above or from storage, the computing system, in performing one or more embodiments of the disclosure, may extract one or more data items from the obtained data. For example, the extraction may be performed as follows by the computing system 700 in FIG. 7A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The above description of functions presents only a few examples of functions performed by the computing system of FIG. 7A and the nodes and/or client device in FIG. 7B. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method for detecting Command and Control (C&C) toward a web application in a network, comprising:
   obtaining, using a Web Application Firewall (WAF) of the network, network traffic between the web application and a server, where the server is outside the network, and wherein the network traffic is decrypted and reformatted by the WAF;
   transmitting the network traffic from the WAF to a machine learning model;
   determining, using the machine learning model, whether the network traffic comprises a command signature;
   in response to determining that the network traffic comprises a command signature, generating a notification; and
   determining, upon receiving the notification, whether the server is a C&C by analyzing, by a security personnel, the network traffic,
   wherein the decrypted and reformatted network traffic, as determined by the WAF, comprises the features: whether the port scanning activity is suspicious; whether the network traffic includes a data exfiltration command; whether the network traffic includes a memory manipulation command; whether the network traffic includes a crypto vulnerability exploit command; whether the network traffic includes a command shell command; and whether the network traffic includes a reverse HTTP shell command.

2. The method according to claim 1,
   wherein the machine learning model comprises a Random Forest (RF) classifier, and
   wherein the RF classifier comprises a plurality of decision trees.

3. The method according to claim 2, further comprising training the machine learning model, wherein training the machine learning model comprises:
   obtaining, an original dataset that comprises a plurality of network traffic samples; and
   generating, from the original dataset, a plurality of bootstrapped datasets,
   wherein each of the plurality of decision trees corresponds to one of the plurality of bootstrapped datasets, and
   wherein each of the plurality of decision trees is trained using its corresponding bootstrapped dataset.

4. The method according to claim 3, wherein the plurality of network traffic samples comprises a normal network traffic sample that does not have any command signature.

5. The method according to claim 2, wherein whether the network traffic comprises a command signature is determined based on the votes of the plurality of decision trees.

6. The method according to claim 1, further comprising:
   in response to determining that the network traffic comprises a command signature, assigning an identifier to the network traffic.

7. The method according to claim 6, wherein the notification comprises the identifier.

8. The method according to claim 1, wherein the network is a local area network.

9. A computer system storing instructions executable by a computer processor, the instructions comprising functionality for:
   receiving network traffic from a Web Application Firewall (WAF) which intercepts communications between a web application in a network and a server, where the server is outside the network, and wherein the network traffic comprises intercepted communications which have been decrypted and reformatted by the WAF; and determining, with a machine learning model that receives the network traffic from the WAF, whether the network traffic comprises a command signature;

wherein, in response to determining that the network traffic comprises a command signature, the machine learning model generates a notification, wherein, the notification and associated network traffic are received and analyzed by a security personnel to determine whether the server is a C&C, wherein the decrypted and reformatted network traffic, as determined by the WAF, comprises the features: whether the port scanning activity is suspicious; whether the network traffic includes a data exfiltration command; whether the network traffic includes a memory manipulation command; whether the network traffic includes a crypto vulnerability exploit command; whether the network traffic includes a command shell command; and whether the network traffic includes a reverse HTTP shell command.

10. The computer system according to claim 9, wherein the machine learning model comprises a Random Forest (RF) classifier, and wherein the RF classifier comprises a plurality of decision trees.

11. The computer system according to claim 10, further comprising training the machine learning model, wherein training the machine learning model comprises:

obtaining an original dataset that comprises a plurality of network traffic samples, generating, from the original dataset, a plurality of bootstrapped datasets, wherein each of the plurality of decision trees corresponds to one of the plurality of bootstrapped datasets, and wherein each of the plurality of decision trees is trained using its corresponding bootstrapped dataset.

12. The computer system according to claim 11, wherein the plurality of network traffic samples comprises a normal network traffic sample that does not have any command signature.

13. The computer system according to claim 10, wherein whether the network traffic comprises a command signature is determined based on the votes of the plurality of decision trees.

14. The computer system according to claim 9, wherein, in response to determining that the network traffic comprises a command signature, the machine learning model assigns an identifier to the network traffic.

15. The computer system according to claim 14, wherein the notification comprises the identifier.

16. The computer system according to claim 9, wherein the network is a local area network.

17. A system, comprising:

a web application in a network, a Web Application Firewall (WAF), wherein the WAF obtains network traffic between the web application and a server, where the server is outside the network, and wherein the network traffic is decrypted and reformatted by the WAF, a machine learning model, a security personnel, and a computer comprising:

one or more computer processors, and a computer readable medium storing instructions executable by a computer processor, the instructions comprising functionality for:

receiving the network traffic from the WAF, determining, with the machine learning model, whether the network traffic comprises a command signature, and generating, in response to determining that the network traffic comprises a command signature, a notification, wherein, upon receiving the notification, the security personnel analyzes the associated network traffic to determine if the server is a C&C, wherein the decrypted and reformatted network traffic, as determined by the WAF, comprises the features: whether the port scanning activity is suspicious; whether the network traffic includes a data exfiltration command; whether the network traffic includes a memory manipulation command; whether the network traffic includes a crypto vulnerability exploit command; whether the network traffic includes a command shell command; and whether the network traffic includes a reverse HTTP shell command.

* * * * *